N. R. URIE.
VARIABLE SPEED POWER TRANSMISSION MECHANISM.
APPLICATION FILED JAN. 16, 1915.
1,160,216.
Patented Nov. 16, 1915.
2 SHEETS—SHEET 1.
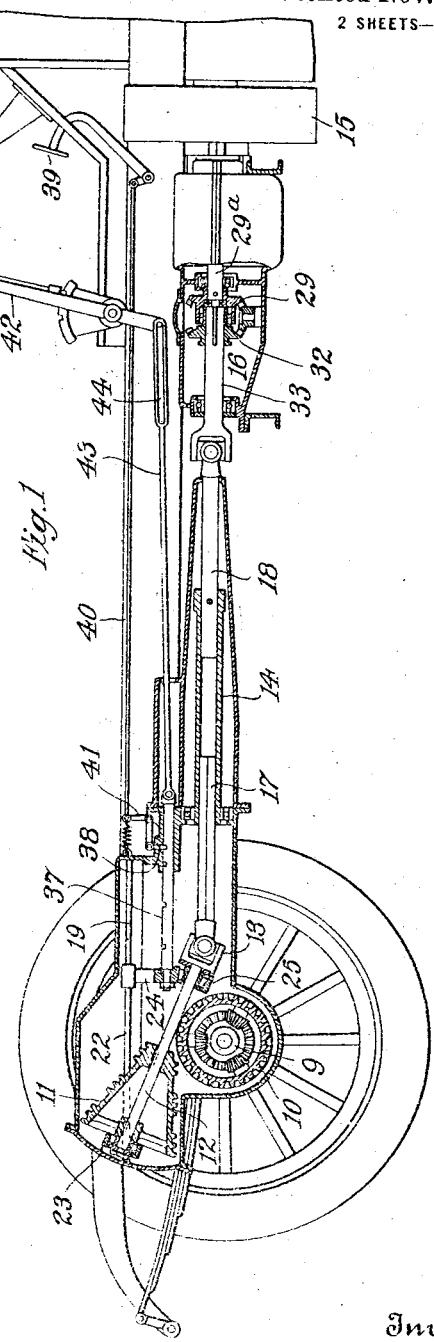
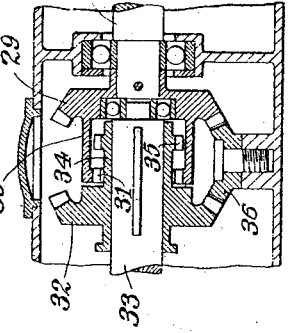
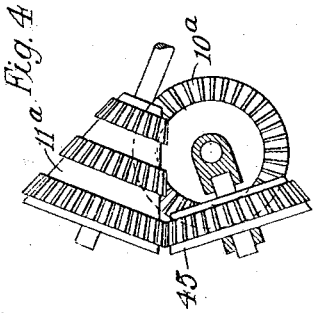
Witnesses:
Inventor
Nimrod R Urie
By his Attorneys

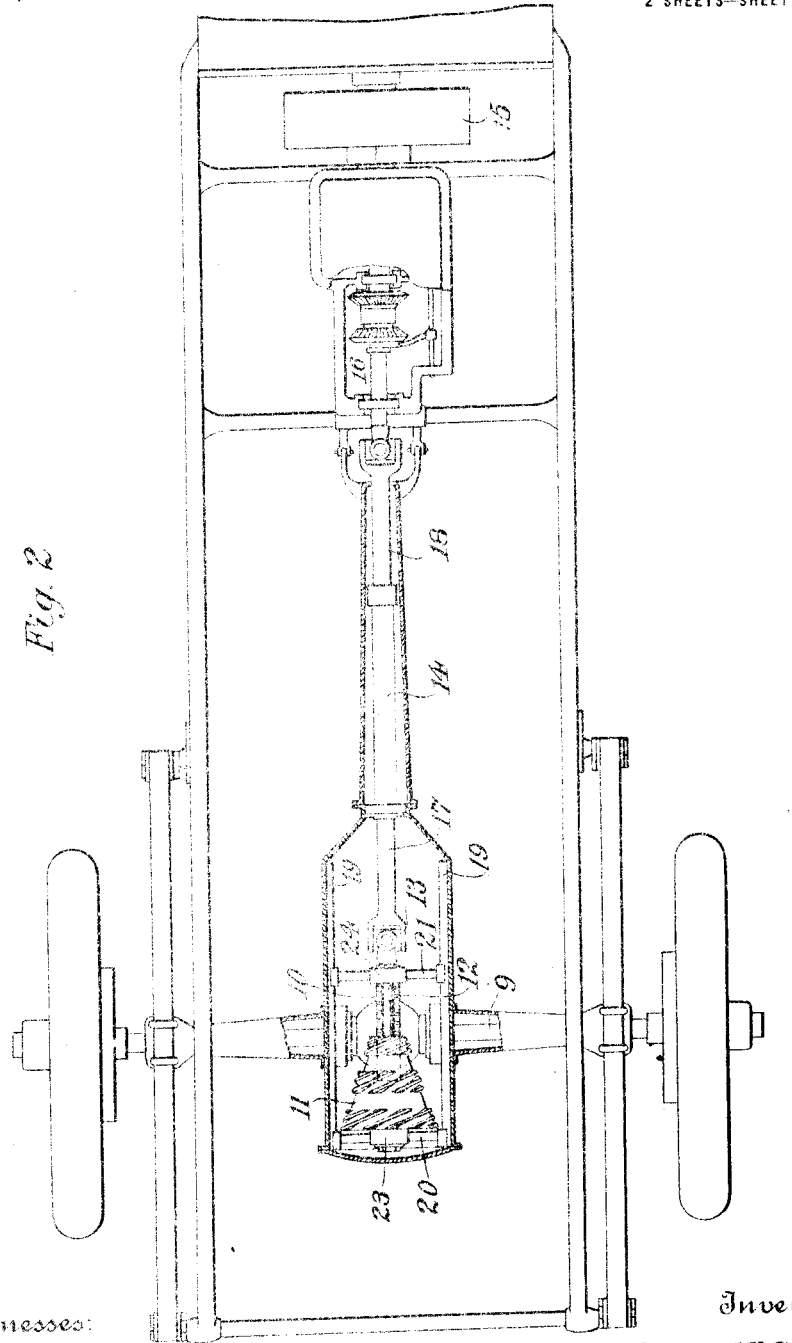

UNITED STATES PATENT OFFICE.

NIMROD B. URIE, OF CARSON CITY, NEVADA.

VARIABLE-SPEED POWER-TRANSMISSION MECHANISM.

1,160,216.  Specification of Letters Patent.  Patented Nov. 16, 1915.

Application filed January 16, 1915. Serial No. 2,357.

*To all whom it may concern:*

Be it known that I, NIMROD B. URIE, residing at Carson City, in the county of Ormsby and State of Nevada, have invented certain new and useful Improvements in Variable-Speed Power-Transmission Mechanism, of which the following is a full, clear, and exact description.

The invention which forms the subject matter of the present application for Letters Patent relates to variable speed power transmission mechanism of the so-called cone type, in which advantage is taken of the varying diameter of a cone to transmit power at a variable rate. So far as I am aware, mechanism of that type has not proved wholly satisfactory in practice. I have accordingly been led to devise my present invention, which has for its chief object to provide a simple and effective transmission mechanism of the type referred to.

A further object is to provide a transmission mechanism in which the gear-change can be effected by the energy of the driving shaft or the driven element under control of the operator.

To these and other ends the invention consists in the novel features of construction and combinations of parts hereinafter described.

As the invention will find an important field of utility in connection with automobiles I have illustrated in the accompanying drawings a convenient and effective embodiment for automobile use.

Referring to the drawings, Figure 1 is a side view, partly in section, of a motor car equipped with my invention in its preferred form. Fig. 2 is a plan view of the same, with the body of the car removed and certain parts of the apparatus omitted for the sake of clearness. Fig. 3 is a detail sectional view of the reversing gearing shown in Figs. 1 and 2. Fig. 4 is a fragmentary view illustrating a modification of the cone-transmission mechanism.

Loose on the rear axle (on which the rear wheels are fixed for the purpose of driving the vehicle) is a worm gear 10, adapted to mesh with a gear cone 11 fixed on an axial shaft 12 connected by a flexible coupling, as for example a universal joint 13, to the transmission shaft, which is itself driven by the motor (not shown) through the agency of a clutch 14 and suitable reversing gearing 16. The transmission shaft is made in two parts, 17, 18, which telescope together but are of such cross-sectional contour as to cause the two to rotate together, the part 14 being preferably a square tube united to the right hand portion of the shaft, as shown.

On opposite sides of the same 11 are two rails or guides 19, parallel to the transmission shaft 17–18, and slidably mounted thereon is a rectangular carriage composed of two transverse members 20, 21, the ends of which engage the rails, and two longitudinal members, (one of which is shown at 22) connecting the transverse members rigidly together. The member 20 carries a bearing for the forward end of the cone shaft 17 and on the member 21 is a hanger or depending bracket 24, carrying a bearing 25 for the forward end of said shaft, the arrangement of the bearings being such that the lower side of the cone is parallel to the driving shaft and in position to mesh with the teeth of the gear 10. Thus as the carriage slides on its rails the cone always moves in the same plane, and neither the cone nor the gear has any transverse radial movement relatively to the other.

The motion of the gear 10 is imparted to the axle through any suitable differential gearing, for example as shown in Fig. 1.

From the inclination of the threads and teeth on the cone 11 and gear 10 in Fig. 2 it will be seen that when the transmission shaft 17–18 is rotated in the clockwise direction as viewed from the front the vehicle will move forward. To reverse the shaft, and hence the direction of the vehicle's travel, the reversing gear 16 is employed. As shown in Fig. 3 the motor has a bevel gear 32 fixed on shaft 33 driven by the engine through the clutch 14 having a sleeve 30 provided on its inside at the outer end with clutch teeth 34 and a bevel gear 32 feathered on the shaft 33 and shifted axially by means of a hand lever (not shown), and having a sleeve 31 inside teeth 35 and provided with clutch teeth 35 at its inner end; and a bevel pinion 36 rotating on a fixed axis and meshing with 32 and 33. When the gear 32 is in the position shown in Fig. 2 it is in mesh with the pinion, but the clutch teeth 34–35 are out of engagement. Hence the gear 32 and shaft 33 are driven, through the bevel pinion 36, in the opposite direction to the shaft 29ª; but when the gear 32 is shifted leftwardly it is disengaged from the pinion and the clutch teeth are engaged, so that the gear 32 and shaft 33 are driven direct from the shaft 27ª and in the same direction.

In driving the vehicle forward the cone rotates clockwise (as seen from the front) and hence it tends to move backward; and since it is, in general, easier for the cone itself to move backward than to drive the car forward the cone would in fact move backward, whenever the engine is driving the shaft 18 (Fig. 1) in the clockwise direction, unless it is positively held. For this purpose the hanger 24 is provided with a forwardly extending rod 37 having notches to coöperate with a latch 38 which can be raised out of engagement by means of a foot lever 39 operating through a link 40 and bell-crank 41. In the cone illustrated the spaces between the three groups of threads are intended to be narrower (axially) than the arc across which the teeth on the gear mesh with the threads on the cone, so that the gear can be in mesh with two groups of threads at once. Hence, if the shaft 17 is rotating in the forward direction (clockwise as seen from the front) and the latch 38 is raised, it will be seen that the cone will automatically move backward from "high" to "intermediate", from "intermediate" to "low", and from "low" to "neutral". On the other hand, by throwing out the clutch 15 and latch 38 while the vehicle is traveling forward the cone will shift from "low" to a higher speed. The shift to "intermediate" or "high" can also be effected automatically by throwing out the latch 38 and reversing the shaft 18 by means of the reversing gear 16. In the latter case the cone is rotated by the engine counterclockwise (as seen from the front) and hence screws itself forward on the gear 10. In Fig. 1 the cone is shown moved back out of mesh with the gear 10. It is then in "neutral". To move it forward into mesh with the gear the hand lever 42 is provided, connected to the locking rod 37 by means of a link 43. The slot 44 at the forward end of the link permits the above-described automatic change of speeds after the cone has been shifted from "neutral" into "low" by the hand lever.

In the construction illustrated in Fig. 4 the cone 11ª has ordinary gear teeth instead of worm-threads, and the worm gear of the construction shown in Figs. 1 and 2 is replaced by a bevel gear 10ª, meshing with a bevel gear 45 which in turn meshes with the cone 11ª. In this type the cone is shifted manually, through the medium of the usual hand lever, not shown.

It is to be understood that the invention is not limited to the mechanisms herein specifically illustrated and described, but can be embodied in other forms without departure from its spirit.

What I claim as my invention is:

1. In a variable-speed power-transmission mechanism, the combination of a worm-gear, a worm-gear-cone in mesh therewith, supporting means for the cone permitting movement thereof in a direction parallel to its side which is in mesh with the gear, and releasable means to lock the supporting means in any one of a plurality of positions.

2. In a variable-speed power-transmission mechanism, the combination of a telescoping shaft comprising an axially stationary part and an axially movable part; a gear-cone connected with the axially movable part of the shaft and arranged with its axis at an angle to the same; supporting means for the cone, permitting movement thereof in a direction parallel to the shaft; and a gear meshing with the cone.

3. In a variable-speed power-transmission mechanism for automobiles, the combination of a driving axle; a worm-gear thereon; a worm-gear-cone meshing with the gear; a telescoping shaft to drive the cone, comprising an axially stationary part, and an axially movable part connected with the cone at an angle to the axis thereof; means for reversing the direction of rotation of the shaft; supporting means for the cone permitting movement thereof in a direction parallel to the path of the axially movable part of the shaft; and releasable means to lock the supporting means in any one of a plurality of positions.

4. In a variable-speed power-transmission mechanism, the combination of a driving axle; a worm-gear thereon; a worm-gear-cone meshing with the worm-gear to drive the same and tending to shift automatically from a higher to a lower speed when rotated in one direction; releasable means to hold the cone against shifting movement; a driving shaft connected with the cone to drive the same and permitting shifting movement thereof; means for supporting the cone and permitting movement thereof in a path parallel to the side in mesh with the worm-gear; means for rotating the driving shaft in either direction at will; and a releasable clutch for connecting the driving shaft with a driving motor.

5. In a variable-speed power-transmission mechanism, the combination of a driving axle; a worm-gear thereon; a worm-gear-cone meshing with the worm-gear and shiftable in a path parallel to the side in mesh with the worm-gear; a driving shaft connected with the worm-gear-cone to rotate the same; a releasable clutch for connecting the shaft with a driving motor to drive the same; means between the clutch and the worm-gear-cone to reverse the direction of rotation of the shaft; and releasable means to hold the cone in any one of a plurality of positions in said path.

6. In a variable-speed power-transmission mechanism, the combination of a driving axle; a worm-gear thereon; a worm-gear-cone meshing with the worm-gear and tending to shift from a higher speed to a position out of mesh with the worm-gear when the cone is rotated in one direction; supporting means for the cone, permitting shifting movement thereof to the out-of-mesh position in a path parallel to the side in mesh with the gear; and manual means to shift the cone from the out-of-mesh position into position to mesh with the gear.

In testimony whereof I affix my signature in the presence of two subscribing witnesses.

NIMROD K. URIE.

Witnesses:
 DENVER S. DICKERSON,
 JOHN F. SHAUGHNESSY.